United States Patent
Yoshimura et al.

(10) Patent No.: US 12,534,372 B2
(45) Date of Patent: Jan. 27, 2026

(54) GRAPHITE-COPPER COMPOSITE MATERIAL, HEAT SINK MEMBER USING THE SAME, AND METHOD FOR PRODUCING GRAPHITE-COPPER COMPOSITE MATERIAL

(71) Applicant: UBE Corporation, Ube (JP)

(72) Inventors: Masafumi Yoshimura, Ube (JP); Dai Inamori, Ube (JP); Kenichi Sunamoto, Hiroshima (JP)

(73) Assignee: UBE Corporation, Ube (JP)

( * ) Notice: Subject to any disclaimer, the term of this patent is extended or adjusted under 35 U.S.C. 154(b) by 620 days.

(21) Appl. No.: 17/785,956

(22) PCT Filed: Dec. 16, 2020

(86) PCT No.: PCT/JP2020/046847
§ 371 (c)(1),
(2) Date: Jun. 16, 2022

(87) PCT Pub. No.: WO2021/125196
PCT Pub. Date: Jun. 24, 2021

(65) Prior Publication Data
US 2023/0031882 A1 Feb. 2, 2023

(30) Foreign Application Priority Data

Dec. 17, 2019 (JP) .................................. 2019-227123
Aug. 6, 2020 (JP) .................................. 2020-133449

(51) Int. Cl.
*C01B 32/21* (2017.01)
*B22F 1/12* (2022.01)
(Continued)

(52) U.S. Cl.
CPC ................ *C01B 32/21* (2017.08); *B22F 1/12* (2022.01); *C09K 5/14* (2013.01); *C01P 2004/03* (2013.01);
(Continued)

(58) Field of Classification Search
CPC ........ C01B 32/21; B22F 1/12; C01P 2004/20; C09K 5/14
See application file for complete search history.

(56) References Cited

U.S. PATENT DOCUMENTS

| | | | |
|---|---|---|---|
| 6,610,246 B1* | 8/2003 | Sunamoto | B22F 3/14 419/48 |
| 2010/0207055 A1* | 8/2010 | Ueno | C22C 47/14 252/71 |
| 2011/0259570 A1 | 10/2011 | Suzuki | |

FOREIGN PATENT DOCUMENTS

| CN | 107502767 A | 12/2017 |
|---|---|---|
| CN | 110184494 A | 8/2019 |

(Continued)

OTHER PUBLICATIONS

Liu, Effect of graphite flakes particle sizes on the microstructure and properties of graphite flakes/copper composites, 2018, Journal of Alloys and Compounds 766, pp. 382-390. (Year: 2018).*
(Continued)

Primary Examiner — Monique R Jackson
(74) Attorney, Agent, or Firm — The Webb Law Firm (57) ABSTRACT

A graphite-copper composite material that includes a copper layer having an average thickness of 15 μm or less and scaly graphite particles laminated with the copper layer interposed therebetween. The graphite-copper composite material has a copper volume fraction of 3 to 20%. The graphite-copper composite material further has: (A) copper crystal grains of the copper layer having an average grain size of 2.8 μm or less, a mass fraction of Al of less than 0.02%, and a mass
(Continued)

fraction of Si of less than 0.04%, or (B) an interfacial gap of the copper layer and the scaly graphite particles of 150 nm or less.

8 Claims, 3 Drawing Sheets

(51) Int. Cl.
  *C09K 5/14* (2006.01)
  *H01L 23/373* (2006.01)
(52) U.S. Cl.
  CPC ...... *C01P 2004/20* (2013.01); *C01P 2004/61* (2013.01); *C01P 2006/32* (2013.01); *H01L 23/3733* (2013.01)

(56) References Cited

FOREIGN PATENT DOCUMENTS

| | | |
|---|---|---|
| EP | 2213756 A1 | 8/2010 |
| JP | S62207832 A | 9/1987 |
| JP | H10168502 A | 6/1998 |
| JP | 201067842 A | 3/2010 |
| JP | 2014118621 A | 6/2014 |
| JP | 2017128802 A | 7/2017 |
| JP | 2017155252 A | 9/2017 |
| JP | 201926884 A | 2/2019 |
| JP | 2019094248 A * | 6/2019 |
| WO | 2019066543 A1 | 4/2019 |

OTHER PUBLICATIONS

Liu, The microstructures and properties of graphite flake/copper composites with high volume fractions of graphite flake, 2020, New Carbon Materials, vol. 35, Issue 1, pp. 58-65. (Year: 2020).*
Sohn, Effects of shape and alignment of reinforcing graphite phases on the thermal conductivity and the coefficient of thermal expansion of graphite/copper composites, 2019, Carbon 149, pp. 152-164. (Year: 2019).*
Machine translation of JP2019094248A, published Jun. 2019, Powered by EPO and Google. (Year: 2019).*
Munir, Electric Current Activation of Sintering: A Review of the Pulsed Electric Current Sintering Process, 2010, Journal of the American Ceramic Society, vol. 94, No. 1, pp. 1-19. (Year: 2010).*
Zhu, Microstructure and mechanical strength of near- and sub-micrometre grain size copper prepared by spark plasma sintering, 2017, Materials and Design 117, pp. 95-103. (Year: 2017).*

* cited by examiner

Fig. 5

GRAPHITE-COPPER COMPOSITE MATERIAL, HEAT SINK MEMBER USING THE SAME, AND METHOD FOR PRODUCING GRAPHITE-COPPER COMPOSITE MATERIAL

CROSS-REFERENCE TO RELATED APPLICATIONS

This application is the U.S. national phase of International Application No. PCT/JP2020/046847 filed Dec. 16, 2020, and claims priority to Japanese Patent Application Nos. 2019-227123 filed Dec. 17, 2019 and 2020-133449 filed Aug. 6, 2020, the disclosures of which are hereby incorporated by reference in their entirety.

BACKGROUND OF THE INVENTION

Field of the Invention

The present invention relates to a graphite-copper composite material, a heat sink member using the same, and a method for producing the graphite-copper composite material.

Description of Related Art

A material for a heat dissipation component of a semiconductor equipment is required to have a high thermal conductivity. Copper has a high thermal conductivity, but also has a high thermal expansion coefficient. A metal-graphite composite material has been proposed as a composite material that reduces the thermal expansion coefficient without impairing the high thermal conductivity of copper and can be obtained at a low cost (for example, see Japanese Patent Application Publication No. JP 2017-12882 (Patent Literature 1)). It is disclosed that the metal-graphite composite material of Patent Literature 1 has a high cooling reliability and a low linear expansion coefficient.

CITATION LIST

Patent Literature

Patent Literature 1: JP 2017-128802 A

SUMMARY OF INVENTION

In recent years, with the advancement of new technologies such as the IOT, AI, and electric vehicles, a demand for heat dissipation has further increased. Specifically, a graphite-copper composite material having a high heat dissipation and a stable thermal conductivity of about 700 W/(m·K) which is equal to or higher than 600 W/(m·K) at present, and further about 800 W/(m·K) is considered to be useful.

Therefore, an object of the present invention is to provide a graphite-copper composite material having a higher and more stable thermal conductivity, a heat sink member using the same, and a method for producing the graphite-copper composite material.

As a result of investigations to solve the above-mentioned problem, the present inventors have found that a graphite-copper composite material having a higher and more stable thermal conductivity can be obtained by using predetermined graphite particles that has been subjected to a pretreatment and copper particles having a median diameter of 1.5 μm or less as raw materials.

That is, the present invention provides a graphite-copper composite material that includes: a copper layer having an average thickness of 15 μm or less; and scaly graphite particles laminated with the copper layer interposed therebetween, has a copper volume fraction of 3 to 20%, and includes (A) or (B) below.
 (A) The copper layer contains copper crystal grains having an average grain size of 2.8 μm or less, a mass fraction of Al is less than 0.02%, and a mass fraction of Si is less than 0.04%.
 (B) An interfacial gap of the copper layer and the scaly graphite particles is 150 nm or less.

In addition, the present invention provides a heat sink member using the graphite-copper composite material described above.

Further, the present invention provides a method for producing the graphite-copper composite material described above, the method including: a step of subjecting graphite particles to a pretreatment to obtain scaly graphite particles having a thickness of 50 μm or less; a step of mixing the scaly graphite particles with copper particles having a median diameter of 1.5 μm or less to obtain a molding raw material; and a step of sintering a molded body obtained by molding the molding raw material by a multiaxial electric current sintering method.

According to the present invention, it is possible to provide a graphite-copper composite material having a higher and more stable thermal conductivity, a heat sink member using the same, and a method for producing the graphite-copper composite material.

DESCRIPTION OF THE INVENTION

The following will describe embodiments of the present invention in detail.

<Graphite-Copper Composite Material>

A graphite-copper composite material (hereinafter also simply referred to as "composite material") of the present invention is a sintered body obtained by using scaly graphite particles and copper particles as raw materials. The scaly graphite particles are laminated with a copper layer having an average thickness of 15 μm or less interposed therebetween. Here, "with a copper layer interposed therebetween" means that the scaly graphite particles (hereinafter also simply referred to as "graphite particles") are connected by an adjacent copper layer. In other words, the scaly graphite particles in the composite material are electrically continuous.

By setting the average thickness of the copper layer to 15 μm or less, coarse layers of copper locally present between the scaly graphite particles are reduced. Since copper has a lower thermal conductivity than graphite, a composite material having a high thermal conductivity can be obtained by reducing the coarse layers of copper. In addition, the thickness of the copper layer decreases as the copper volume fraction of the composite material decreases. In order to stably obtain a high thermal conductivity of 750 W/(m·K) or more, the average thickness of the copper layer is preferably 11 μm or less.

The copper volume fraction in the composite material is 3 to 20%. Since the content of graphite having a high thermal conductivity is as high as 80 to 97%, the thermal conductivity of the composite material of the present invention is very high. Copper acts as a binder in the composite material. In consideration of avoiding fracture of the composite material during processing, the volume ratio of graphite to copper (graphite: copper) in the composite material is preferably 80:20 to 97:3. In order to ensure a high thermal conductivity of 750 W/(m·K) or more and good processability, the volume ratio (graphite:copper) is more preferably 84:16 to 95:5. The copper volume fraction in the composite material can be adjusted by the blending ratio of the raw materials in production.

Further, the composite material of the present invention includes (A) or (B) below.
 (A) The copper layer contains copper crystal grains having an average grain size of 2.8 μm or less, the mass fraction of Al is less than 0.02%, and the mass fraction of Si is less than 0.04%.
 (B) An interfacial gap of the copper layer and the scaly graphite particles is 150 nm or less.

Each will be described below.

The average grain size of the copper crystal grains in the copper layer can be calculated from, for example, a crystal grain size distribution obtained from crystal orientation mapping data of an electron back scattrer diffraction (EBSD) analysis. In order to obtain a composite material having stable thermal conductivity and processability, the average grain size of the copper crystal grains is preferably 2.5 μm or less, and more preferably 2.1 μm or less. As described later, in the production of the composite material of the present invention, copper particles having a small median diameter, that is, a small particle size are used. As a result, the grain size of the copper crystal grains in the composite material after sintering can be reduced.

Impurities in the composite material can be confirmed from energy dispersive X-ray spectroscopy (EDS) composition mapping data in a scanning electron microscope image at a magnification of 150 times of a cross section (a laminated cross section) perpendicular to a laminating direction of the scaly graphite particles in the composite material. The mass fraction of Al calculated from the mapping data is less than 0.02%, and the mass fraction of Si is less than 0.04%. In order to obtain a composite material having a higher thermal conductivity and good processability, the mass fraction of Al is preferably less than 0.01%, and the mass fraction of Si is preferably less than 0.02%.

Si and Al are impurities having low thermal conductivities. Since the contents of such impurities are limited, in the composite material of the present invention, thermal conduction at the interface between the copper layer and the graphite particles is not hindered. In addition, a crack during processing due to a lump of Si or Al can also be avoided. In other words, one feature of the composite material of the present invention is that the composite material contains the copper crystal grains having a predetermined average grain size, and the contents of the impurities are limited.

Alternatively, in the composite material of the present invention, the interfacial gap of the copper layer and the graphite particles is 150 nm or less. Since the copper particles used for producing the composite material of the present invention have a small median diameter, that is, a small particle size, the interfacial gap of the graphite particles and the copper layer in the composite material after sintering can be set to 150 nm or less. In order to obtain a composite material having a more stable thermal conductivity and better processability, the interfacial gap of the graphite particles and the copper layer is preferably 100 nm or less. When the graphite particles and the copper layer are in close contact with each other, since a heat loss generated at the interface is reduced and the respective layers support each other, the crack during processing can be suppressed.

The interface between the graphite particles and the copper layer is an interface having a length of 6.0+0.1 μm in a measurement visual field. The interfacial gap of the graphite particles and the copper layer is a value obtained by averaging distances between the layers calculated at five equal intervals in any five visual fields. For example, the interfacial gap of the graphite particles and the copper layer can be calculated by an image analysis described below.

Figure 1:
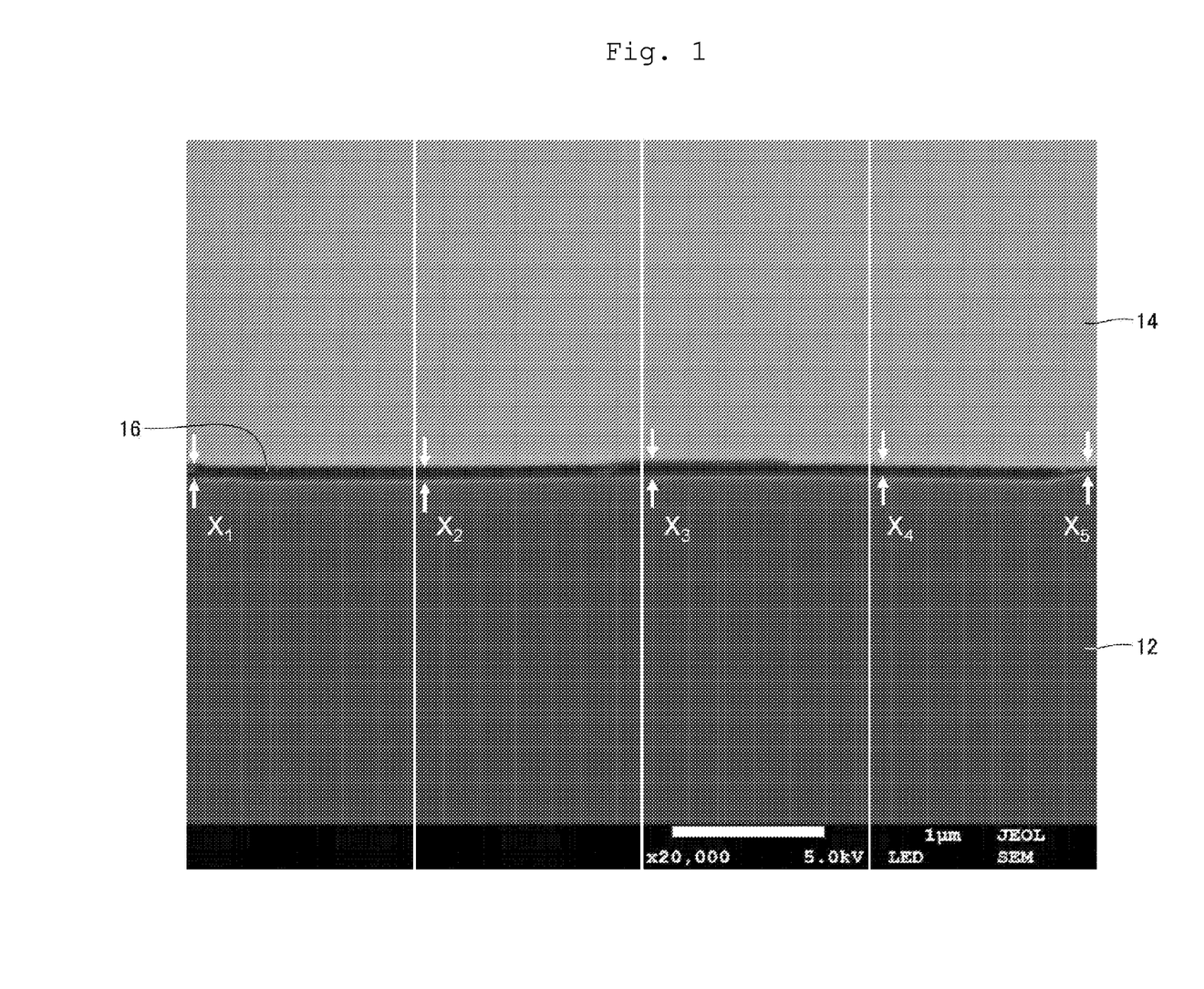
FIG. 1 is a scanning electron microscope image illustrating a method for evaluating an interfacial gap of graphite particles and a copper layer.

The cross section (the laminated cross section) perpendicular to the laminating direction of the scaly graphite particles in the composite material is observed with a scanning electron microscope at a magnification of 20,000 times to obtain a microscope image of 4.5 μm long and 6.0 μm wide. An interface having a length of 6.0+0.1 μm is randomly selected, and this interface is adjusted to be the center of the right and left of the image. As illustrated in FIG. 1, distances ($X_1$, $X_2$, $X_3$, $X_4$, and $X_5$) in a longitudinal direction of the visual field between graphite particles 12 and a copper layer 14 at five equal intervals in an interface 16 are measured, and an average value ($X_{av}$) thereof is calculated.

The average value of distances between the layers is similarly calculated in five randomly selected visual fields, and the average value can be used as the interfacial gap of the graphite particles and the copper layer in the composite material.

In a case of any of (A) and (B) above, the composite material of the present invention preferably has a thermal conductivity of 700 W/(m·K) or more. For use in high-output electronic components and the like, the thermal conductivity is more preferably 750 W/(m·K) or more. The thermal conductivity is a value obtained by cutting out a sample having a predetermined outer diameter of 10 mm×a thickness of 2.5 mm from a central portion of the sintered body, measuring the thermal conductivity using LFA 447 manufactured by NETZSCH Company in accordance with a laser flash method (JIS H 7801: 2005), and averaging the thermal conductivities of samples cut out from five sintered bodies.

Further, the standard deviation of the thermal conductivity is preferably 50 W/(m·K) or less, and more preferably 33 W/(m·K) or less in order to more stably produce the composite material. The standard deviations of the thermal conductivities measured for the five sintered bodies produced by one equipment indicate stability of the thermal conductivity. The composite material of the present invention has a high and stable thermal conductivity.

The composite material of the present invention preferably has a flexural strength of 25 MPa or more, and more preferably 30 MPa or more for use in a product requiring a higher mechanical strength. The standard deviation of the flexural strength is preferably 10 MPa or less, and more preferably 5 MPa or less in order to more stably produce the composite material. The flexural strength in the present specification is a value obtained by measuring for five sintered bodies similar to those described above with reference to three-point bending measurement (JIS R 1601: 2008) and getting the average. The standard deviations of the flexural strengths in the five samples indicate stability of the flexural strength. Thus, the composite material of the present invention also has a higher and more stable flexural strength.

In addition, the composite material of the present invention preferably has a thermal expansion coefficient of $10 \times 10^{-6}/°$ C. or less. Here, the thermal expansion coefficient is a value at 100° C. Since the composite material of the present invention has a lower thermal expansion coefficient than existing copper, the composite material can be treated at high temperatures. The thermal expansion coefficient of the composite material of the present invention is more preferably about 4.5 to $7.0 \times 10^{-6}/°$ C. since the composite material can be used for products required to have high-temperature durability used for automobiles and the like. Thus, the composite material of the present invention has a lower thermal expansion coefficient in addition to a higher and more stable thermal conductivity and a higher and a more stable flexural strength.

The thermal expansion coefficient of the composite material can be measured by a method in accordance with light scanning measurement of JIS Z 2285: 2003. As a linear thermal expansion coefficient measuring equipment, a type of SL-2000M manufactured by Shinagawa Refractories Co., Ltd. can be used.

<Producing Method>

The composite material of the present invention can be produced by subjecting graphite particles to a pretreatment to obtain desired scaly graphite particles, mixing the graphite particles with predetermined copper particles to obtain a molding raw material, molding the molding raw material, and sintering the molding raw material under predetermined conditions. Each step will be described below.

(Graphite Pretreatment)

The pretreatment (hereinafter may be referred to as "thinning") of the graphite particles is performed by applying a shear force to the graphite particles to reduce the thickness. The graphite particles to be used are not particularly limited, but generally have a long side of about 2,000 to 10 μm and a thickness of about 200 to 20 μm. Examples of the graphite that can be used include +3299 (manufactured by Ito Graphite Co., Ltd.).

Figure 2:
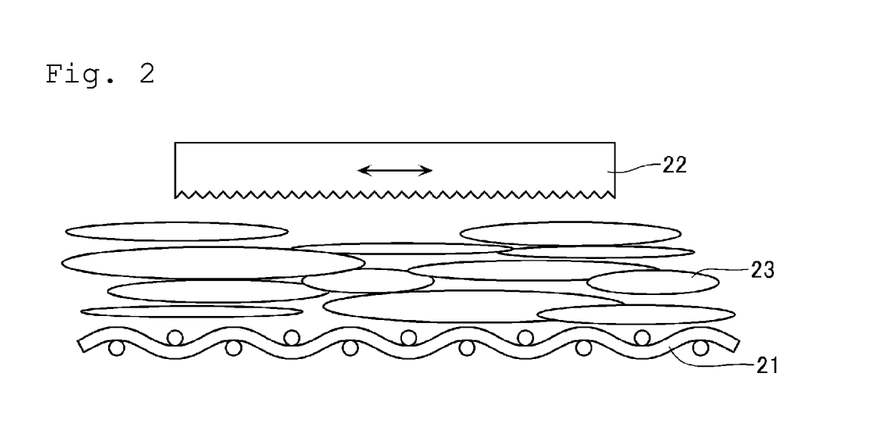
FIG. 2 is a side view illustrating an example of a method for thinning graphite particles.

In the pretreatment, for example, as illustrated in FIG. 2, a sieve 21 on which graphite particles 23 are placed and a grindstone 22 that is in contact with the graphite particles 23 and can reciprocate in a horizontal direction can be used. A length of the long side of the obtained scaly graphite particles can be selected according to a mesh size of the sieve 21 to be used. The mesh size of the sieve 21 can be, for example, about 53 μm. As the grindstone 22, a rough grindstone to a medium grindstone are preferable, and one using alundum or natural diamond as abrasive grains is preferable. The graphite particles 23 are disposed on the sieve 21, and the grindstone 22 is reciprocated in the horizontal direction to apply the shear force, thereby reducing the thickness of the graphite particles 23.

The graphite particles having a void generated inside due to the shear force or those that are fragile and are easily collapsed are removed by the sieve 21. As a result, in the obtained scaly graphite particles, the thickness is reduced and the density is increased. Further, impurities in the graphite particles are removed, leading to the improvement in purity. Note that the scaly graphite particles of various sizes can be obtained by changing a size of the abrasive grains used for treatment and the mesh size of the sieve.

Figure 3:
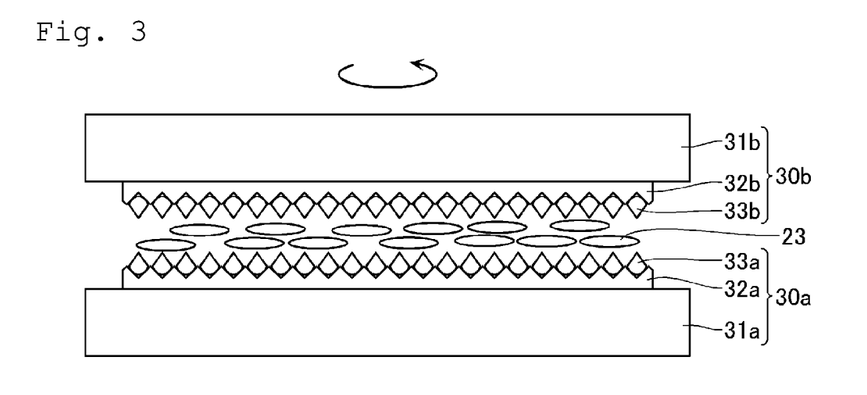
FIG. 3 is a side view illustrating another example of a method for thinning graphite particles.

As illustrated in FIG. 3, two rotating grindstones 30a and 30b can also be used for the pretreatment of the graphite particles. The rotating grindstones 30a and 30b have metal plates 31a and 31b respectively, and abrasive grains 33a and 33b such as diamond are provided on opposing surfaces. The abrasive grains 33a and 33b are fixed by joining metal members 32a and 32b such as plating, and the graphite particles 23 to be treated are disposed between the abrasive grains 33a and 33b. When the graphite particles 23 are subjected to the pretreatment using the rotating grindstones 30a and 30b, relatively small and thin scaly graphite particles can be efficiently obtained.

By the pretreatment as described above, the scaly graphite particles having a thickness of 50 μm or less are obtained. The thickness shown here is an average value of the thicknesses of the 50 scaly graphite particles after the pretreatment. The scaly graphite particles have a structure in which a plurality of graphite pieces overlap each other. As the thickness of the scaly graphite particles is smaller, a gap between the graphite pieces in the graphite particles is reduced, and the thermal conductivity and mechanical characteristics are improved. The thickness of the scaly graphite particles can be adjusted by the graphite particles to be used, the pretreatment conditions, and the like.

In order to obtain a composite material having a higher thermal conductivity and better processability, the thickness of the scaly graphite particles is preferably 30 μm or less. By performing the pretreatment in this way, a shape of the scaly graphite particles is fixed. For example, when the sieve 21 having a mesh size of 53 μm is used, the scaly graphite particles having a long side of 60 μm or more are obtained.

(Preparation of Copper Particles)

As the copper particles, copper particles having a volume-based median diameter of 1.5 μm or less are used. The median diameter of the copper particles is preferably 1.0 μm or less. It has been found by the present inventors that a composite material having stable thermal conductivity and processability can be obtained by using the copper particles having a small median diameter of 1.5 μm or less. The copper particles having the median diameter of 1.5 μm or less can be produced by any method. For example, desired copper particles are obtained by a chemical reduction method or a physical production method.

(Mixing)

The scaly graphite particles obtained by performing the pretreatment and the copper particles are blended in a predetermined ratio and wet-mixed with an organic solvent to obtain the molding raw material. It is desired that the blending ratio of the raw materials is selected such that the volume ratio of graphite to copper (graphite:copper) in the composite material are 80:20 to 97:3, and from the viewpoint of thermal conductivity and processability, the volume ratio is particularly preferably selected so as to be 74:16 to 95:5. Specific examples of the suitable organic solvent include toluene and xylene.

(Sintering)

First, a small amount (about 40 g or less) of the molding raw material is filled in a predetermined molding die, and compacted at a pressure of about 3 to 15 MPa using, for example, a hydraulic hand press. As the molding die, for example, an SUS mold having a diameter of 30 mm can be used. The filling and compacting of the molding raw material are repeated to produce a molded body having a desired size. The obtained molded body is sintered by a multiaxial electric current sintering method to obtain a sintered body to be the composite material of the present invention.

Figure 4:
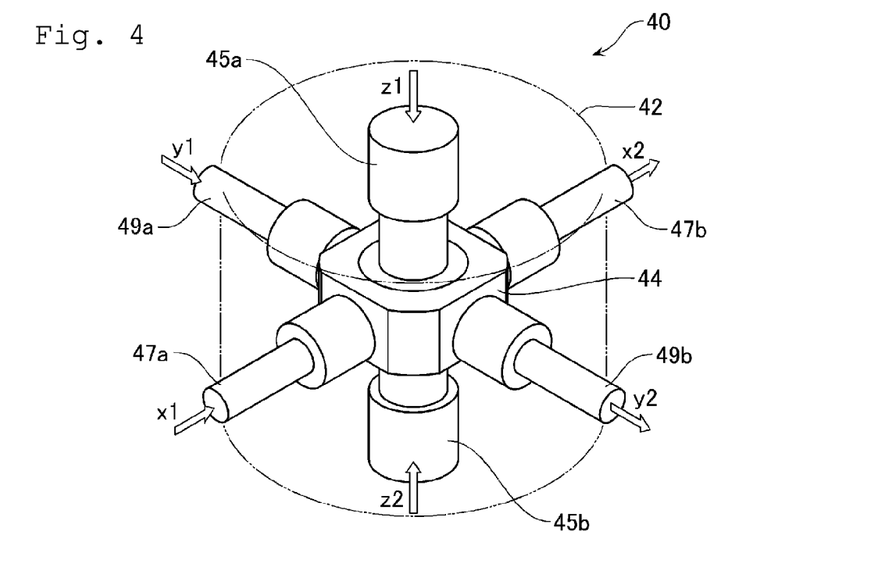
FIG. 4 is a perspective view illustrating a multiaxial electric current sintering equipment.

Here, with reference to FIG. 4, an outline of a multiaxial electric current sintering equipment will be described. In a multiaxial electric current sintering equipment 40 illustrated in FIG. 4, a carbon mold 44 in which the molded body is housed can be fixed in a vacuum chamber 42 by pressurizing shafts 45a and 45b in a vertical direction and heating shafts (A) 47a and 47b and heating shafts (B) 49a and 49b in the horizontal direction. The heating shafts (A) 47a and 47b and the heating shafts (B) 49a and 49b are configured to be alternately energized. The heating shafts (A) are energized in directions of arrows x1 and x2, and the heating shafts (B) are energized in directions of arrows y1 and y2.

In the multiaxial electric current sintering equipment 40, the pressurizing shafts 45a and 45b and the heating shafts 47a, 47b, 49a, and 49b are separated from each other. Specifically, the pressurizing shafts 45a and 45b are in a z-axis direction, the heating shafts (A) 47a and 47b are in an x-axis direction, and the heating shafts (B) 49a and 49b are in a y-axis direction. This makes independent control of pressurizing and heating possible, so that a uniform temperature distribution can be obtained in a radial direction of a sintered portion.

In the sintering, after the carbon mold 44 in which the molded body is housed is fixed in the vacuum chamber 42, the pressure in the vacuum chamber 42 is reduced to 100 Pa or less, preferably 50 Pa or less in order to suppress oxidative deterioration of components in the equipment. Next, the heating shafts (A) 47a and 47b are first energized, and heating is performed to about 650 to 750° C., preferably about 670 to 730° C.

Thereafter, switching to the heating shafts (B) 49a and 49b is performed, and heating is performed to about 930 to 980° C., preferably about 940 to 970° C. Further, pressurizing is performed in the direction of arrow z1 and the direction of arrow z2 by the pressurizing shafts 45a and 45b in the vertical direction. The pressure at this time is preferably about 10 to 100 MPa, and more preferably about 30 to 50 MPa.

Since the molded body is sintered with the uniform temperature distribution by the multiaxial electric current sintering method, a composite material with stable quality can be produced. Moreover, as described above, since predetermined scaly graphite particles obtained by performing the pretreatment and the copper particles having a median diameter of 1.5 μm or less were used as the raw materials, a composite material having a lower thermal expansion coefficient in addition to a higher and more stable thermal conductivity and a higher and more stable flexural strength was obtained.

In a case of a sintered body of a simple metal, it is expected that interface resistance is increased by using metal particles having a small particle (median) size and reducing the crystal grain size of the sintered metal, and thus the thermal conductivity is decreased. However, in the composite material of the present invention, the copper particles having a median diameter of 1.5 μm or less enter between the scaly graphite particles, so that vacancy generated at the interface between the graphite particles and the copper layer is reduced, and an interfacial gap is reduced to 150 nm or less. As a result, it is considered that hindrance of the thermal conductivity and deterioration of the mechanical strength due to the vacancy and the gaps can be suppressed.

The composite material of the present invention can be suitably used as a heat sink (a heat sink member). The heat sink member is used in a wide range of fields such as a wireless communication field, an electronic control field, an optical communication field, and the like. Specific examples of the application include a power semiconductor module, an optical communication module, a projector, a Peltier cooler, a water-cooled cooler, and an LED heat dissipation fan.

Figure 5:
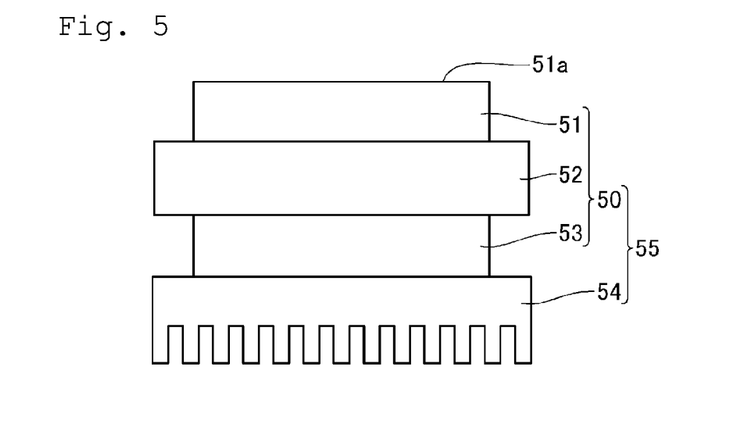
FIG. 5 is a side schematic view illustrating a cooling substrate.

FIG. 5 illustrates an example of a cooling substrate using the heat sink. A cooling substrate 55 includes a heat sink 50 and a cooling layer 54. The heat sink 50 has an electrical insulating layer 52 and a wiring layer 51 sequentially laminated on a stress buffer layer 53. A heat-generating element such as a semiconductor element is mounted on a mounting surface 51a on an upper surface of the wiring layer 51. The composite material of the present invention can be used for any one layer of the stress buffer layer 53 and the wiring layer 51.

Heat generated in the heat-generating element mounted on the mounting surface 51a of the heat sink 50 is sequentially conducted to the wiring layer 51, the electrical insulating layer 52, the stress buffer layer 53, and the cooling layer 54, and is dissipated from the cooling layer 54. Since the composite material of the present invention has a high and stable thermal conductivity, the heat-generating element can be efficiently cooled and the temperature thereof can be lowered.

EXAMPLES

Next, the present invention will be specifically described with the examples, but the present invention is not limited to the examples below.

Example 1

Commercially available graphite particles were subjected to a pretreatment (thinning) by the method described with reference to FIG. 2 to obtain scaly graphite particles having a thickness of 50 μm or less. The mesh size of the sieve 21 was about 53 μm, and a grindstone using alundum or natural diamond as abrasive grains was used for the grindstone 22. The obtained scaly graphite particles were dried using a dryer. On the other hand, as copper particles, copper particles having a median diameter of 1.5 μm were prepared.

Such that the copper volume fraction after sintering was 20%, 15.33 g of the scaly graphite particles after pretreatment and drying and 15.19 g of the copper particles were blended to obtain a molding raw material. These powders were housed in an eggplant-shaped flask of 250 mL together with 50 mL of toluene as a solvent, and subjected to solvent removal and mixture by an evaporator.

3 g of the molding raw material was put into an SUS mold having a diameter of 30 mm, and compacted at a pressure of 5 MPa using a hydraulic hand press. Molding was performed in which operations of charging and compacting the molding raw material were repeated about more than ten times, and the molded body was taken out from the SUS mold.

The molded body taken out was housed in a cylindrical carbon mold and sintered by the multiaxial electric current sintering method. The carbon mold 44 was disposed in the vacuum chamber 42 of the multiaxial electric current sintering equipment 40 shown in FIG. 4, and fixed by the two heating shafts (A) 47a and 47b on a diagonal line and the two pressurizing shafts 45a and 45b.

The pressure in the vacuum chamber 42 was reduced to 5 Pa by a rotary pump, and the temperature was raised by increasing an output of an equipment power supply. Heating was performed up to 700° C. with the heating shafts (A) 47a and 47b by increasing the temperature, and then changing to the heating shafts (B) 49a and 49b was performed to heat up to 950° C.

After the temperature reached 950° C., the pressure was increased to 50 MPa by the pressurizing shafts 45a and 45b. After displacement of a cylinder due to the pressurizing stopped, the cylinder was held for 30 seconds, and the output of the power supply was lowered to cool the equipment. After the cooling, the carbon mold 44 was taken out from the equipment, and a cylindrical sintered body was obtained from the mold.

The same operation was performed five times to produce the five sintered bodies, and a composite material of Example 1 was obtained.

Example 2

A composite material of Example 2 was produced in the same manner as in Example 1 except that the molding raw material was changed such that the copper volume fraction after the sintering was 16%.

Example 3

A composite material of Example 3 was produced in the same manner as in Example 1 except that the molding raw material was changed such that the copper volume fraction after the sintering was 10%.

Example 4

A composite material of Example 4 was produced in the same manner as in Example 1 except that the molding raw material was changed such that the copper volume fraction after the sintering was 5%.

Example 5

A composite material of Example 5 was produced in the same manner as in Example 1 except that the scaly graphite particles having a thickness of 30 μm or less after the pretreatment were used.

Comparative Example 1

A composite material of Comparative Example 1 was produced in the same manner as in Example 1 except that the copper particles were changed to copper particles having a median diameter of 2.0 μm.

Comparative Example 2

A composite material of Comparative Example 2 was produced in the same manner as in Comparative Example 1 except that the molding raw material was changed such that the copper volume fraction after the sintering was 16%.

Comparative Example 3

A composite material of Comparative Example 3 was produced in the same manner as in Comparative Example 1 except that the molding raw material was changed such that the copper volume fraction after the sintering was 10%.

Comparative Example 4

An attempt was made to produce a sintered body of Comparative Example 4 in the same manner as in Comparative Example 1 except that the copper volume fraction after the sintering was changed to 5%. However, the sintered body itself was broken during processing, and a composite material was not obtained.

Comparative Example 5

A composite material of Comparative Example 5 was produced in the same manner as in Comparative Example 1 except that the commercially available graphite particles were used without the pretreatment.

The molding raw materials used in Examples 1 to 5 and Comparative Examples 1 to 5 are summarized in Table 1 below.

TABLE 1

|  |  | Scaly graphite particles | | | Copper particles |
|---|---|---|---|---|---|
|  |  | Thinning | Thickness (μm) | Long side (μm) | Median diameter (μm) |
| Examples | 1 | Yes | 50 | 300 | 1.5 |
|  | 2 | Yes | 50 | 300 | 1.5 |
|  | 3 | Yes | 50 | 300 | 1.5 |
|  | 4 | Yes | 50 | 300 | 1.5 |
|  | 5 | Yes | 30 | 300 | 1.5 |
| Comparative Examples | 1 | Yes | 50 | 300 | 2.0 |
|  | 2 | Yes | 50 | 300 | 2.0 |
|  | 3 | Yes | 50 | 300 | 2.0 |
|  | 4 | Yes | 50 | 300 | 2.0 |
|  | 5 | No | 70 | 300 | 1.5 |

The composite materials of the examples and the comparative examples were observed as follows. In each case, measurements were made for five composite materials were measured, and an average was taken.

From confirmation of organizational structures by the scanning electron microscope and image analysis thereof, average thicknesses of the graphite particles and the copper layers were confirmed. In calculating the average thicknesses, ten lines were first drawn in an image longitudinal direction in the electron microscope image at a magnification of 100 times of the cross section (the laminated cross section) perpendicular to the laminating direction of the graphite particles. Widths of all the graphite particles and the copper layers that can exist in the image were measured from intersections of the lines and the interfaces between graphite and copper, the maximum value of the widths of the graphite particles was taken as the maximum thickness of the graphite particles, and an average value of the widths of the copper layers was taken as the average thickness of the copper layers. Results thereof are summarized in Table 2 below. For reference, values at the time of molding preparation are described for the volume fractions.

TABLE 2

|  |  | Average thickness (μm) | | Volume fraction (%) | |
|---|---|---|---|---|---|
|  |  | Copper layer | Graphite particles | Copper | Graphite |
| Examples | 1 | 15 | 50 | 20 | 80 |
|  | 2 | 11 | 50 | 16 | 84 |
|  | 3 | 8 | 50 | 10 | 90 |

TABLE 2-continued

|  |  | Average thickness (μm) | | Volume fraction (%) | |
|---|---|---|---|---|---|
|  |  | Copper layer | Graphite particles | Copper | Graphite |
|  | 4 | 5 | 50 | 5 | 95 |
|  | 5 | 5 | 30 | 20 | 80 |
| Comparative Examples | 1 | 19 | 50 | 20 | 80 |
|  | 2 | 17 | 50 | 16 | 84 |
|  | 3 | 14 | 50 | 10 | 90 |
|  | 5 | 14 | 70 | 20 | 80 |

Further, the mass fractions of Al and Si as the impurities were confirmed from EDS analysis. Additionally, the average gran size of the copper crystal grains was confirmed from EBSD analysis. Results thereof are summarized in Table 3 below.

TABLE 3

|  |  | Mass fraction (wt %) | | Average of copper crystal grains (μm) |
|---|---|---|---|---|
|  |  | Al | Si | grain size |
| Examples | 1 | 0.009 | 0.002 | 2.09 |
|  | 2 | 0.001 | 0.011 | 1.98 |
|  | 3 | 0.005 | 0.017 | 2.01 |
|  | 4 | 0.001 | 0.005 | 1.95 |
|  | 5 | 0.005 | 0.009 | 2.07 |
| Comparative Examples | 1 | 0.008 | 0.019 | 3.12 |
|  | 2 | 0.006 | 0.002 | 2.85 |
|  | 3 | 0.004 | 0.008 | 2.92 |
|  | 5 | 0.020 | 0.040 | 1.89 |

It is shown in the results of Table 3 that the contents of the impurities cannot be reduced when the graphite particles having a large thickness and not subjected to the pretreatment are used (Comparative Example 5).

Further, gap analysis was performed using the scanning electron microscope image to confirm an amount of the interfacial gap of the graphite particles and the copper layer. Results thereof are summarized in Table 4 below.

TABLE 4

|  | Examples | | | | | Comparative Examples | | | |
|---|---|---|---|---|---|---|---|---|---|
|  | 1 | 2 | 3 | 4 | 5 | 1 | 2 | 3 | 5 |
| Gap (nm) | 32 | 51 | 45 | 121 | 83 | 162 | 180 | 176 | 225 |

The results of Table 2 show that when the graphite particles having a large thickness and not subjected to the pretreatment are used, the interfacial gap of the graphite particles and the copper layer increases to 225 nm (Comparative Example 5).

Samples for measuring physical properties were produced as follows. First, a plate was cut out in the longitudinal direction from a cylindrical center of each of the composite materials of the examples and the comparative examples. This plate was processed to obtain samples having an outer diameter of 10 mm×a thickness of 2.5 mm for thermal conductivity measurement. A direction of measurement of the thermal conductivity is perpendicular to the laminating direction of the composite material (a direction perpendicular to a pressurizing direction).

Samples for measurement of the flexural strength and the thermal expansion coefficient were obtained by processing a plate cut out from the cylindrical center in the same manner as described above into the plate having a length of 5 mm in the longitudinal direction, a length of 25 mm in a lateral direction, and a thickness of 2 mm. Regarding the flexural strength measurement, distances between supporting points were set to 16 mm, but each of the other measurement methods are as follows.

Thermal conductivity: measurement method for a thermal diffusivity of metal by the laser flash method: JIS H 7801: 2005

Flexural strength: test method for a flexural strength of fine ceramics at room temperature: JIS R 1601: 2008

Thermal expansion coefficient: measurement method for a linear expansion coefficient of a metal material: JIS Z 2285: 2003

Each measurement was performed on the five samples, and an average value and a standard deviation were obtained. Obtained results thereof are summarized in Table 5 below.

TABLE 5

|  |  | Thermal conductivity (W/(m·K)) | | Flexural strength (MPa) | | Thermal expansion coefficient |
|---|---|---|---|---|---|---|
|  |  | Average value | Standard deviation | Average value | Standard deviation | $(100° \text{C.}) \times 10^{-6}/°\text{C.}$ |
| Examples | 1 | 788 | 25 | 36 | 2 | 6.2 |
|  | 2 | 801 | 31 | 35 | 3 | 6.1 |
|  | 3 | 813 | 30 | 32 | 3 | 5.0 |
|  | 4 | 825 | 33 | 30 | 5 | 4.5 |
|  | 5 | 799 | 28 | 38 | 3 | 6.5 |
| Comparative Examples | 1 | 790 | 52 | 32 | 4 | 6.5 |
|  | 2 | 799 | 56 | 30 | 6 | 6.0 |
|  | 3 | 810 | 62 | 25 | 7 | 5.5 |
|  | 5 | 730 | 55 | 20 | 12 | 6.5 |

As shown in Table 5 above, the composite materials of the examples have a thermal conductivity of 788 W/(m·K) or more and a standard deviation of 33 W/(m·K) or less. Further, the composite material of the examples has a flexural strength of 30 MPa or more and a standard deviation of 5 MPa or less, and can have a thermal expansion coefficient of $6.5 \times 10^{-6}/°$ C. or less.

The composite material of the examples was produced using the predetermined scaly graphite particles that have been subjected to the pretreatment and the copper particles having a median diameter of 1.5 μm or less as the raw materials, and therefore can have all desired characteristics.

On the other hand, in Comparative Examples 1 to 3 using the copper particles having a median diameter of 2.0 μm, the standard deviation in the thermal conductivity is as large as 52 W/(m·K) or more. When the molding raw material containing such copper particles and prepared such that the copper volume fraction after the sintering was 5% was used, the composite material could not be produced, as shown in Comparative Example 4.

When graphite particles that do not satisfy the predetermined conditions are used, an average value of the thermal conductivities is 700 W/(m·K) or more, but a standard deviation thereof is 55 W/(m·K) (Comparative Example 5). As shown in Comparative Example 5, when the graphite particles (having a thickness of 70 μm) that are not subjected to the pretreatment are used, the impurities (Al, Si) cannot be reduced. In addition, it can be seen from Comparative Example 5 that the interfacial gap of the graphite particles and the copper layer becomes large and cannot be 150 nm or less.

REFERENCE SIGNS LIST

12 Graphite particle
14 Copper layer
16 Interface
21 Sieve
22 Grindstone
23 Graphite particle
30a, 30b Grindstone
31a, 31b Metal plate
32a, 32b Metal member for joining
33a, 33b Abrasive grain
40 Multiaxial electric current sintering equipment
42 Vacuum chamber
44 Carbon mold
45a, 45b Pressurizing shaft
47a, 47b Heating shaft
49a, 49b Heating shaft
50 Heat sink
51 Wiring layer
52 Electrical insulating layer
53 Stress buffer layer
54 Cooling layer
55 Cooling substrate

The invention claimed is:

1. A graphite-copper composite material comprising:
a copper layer having an average thickness of 15 μm or less; and
scaly graphite particles laminated with the copper layer interposed between the graphite particles,
wherein the graphite-copper composite material has a copper volume fraction of 5 to 16% and a scaly graphite particle volume fraction of 84 to 95%, based on the total volume of the graphite and the copper, and wherein:
(A) the copper layer contains copper crystal grains having an average grain size of 2.8 μm or less, a mass fraction of Al is less than 0.02%, and a mass fraction of Si is less than 0.04%, or
(B) an interfacial gap of the copper layer and the scaly graphite particles is 150 nm or less.

2. The graphite-copper composite material according to claim 1, wherein a thermal conductivity of the graphite-copper composite material is 700 W/(m·K) or more, and a standard deviation of the thermal conductivity is 50 W/(m·K) or less, wherein a direction of measurement of the thermal conductivity of the graphite-copper composite material is perpendicular to a laminating direction of the scaly graphite particles.

3. The graphite-copper composite material according to claim 2, wherein a flexural strength of the graphite-copper composite material is 25 MPa or more, and a standard deviation of the flexural strength of the graphite-copper composite material is 5 MPa or less.

4. The graphite-copper composite material according to claim 3, wherein a thermal expansion coefficient of the graphite-copper composite material is $10 \times 10^{-6}$/° C. or less.

5. The graphite-copper composite material according to claim 1, wherein the scaly graphite particles have a thickness of 30 μm or less.

6. A heat sink material comprising the graphite-copper composite material of claim 1.

7. A method for producing the graphite-copper composite material of claim 1, the method comprising:
subjecting graphite particles to a pretreatment to obtain scaly graphite particles having a thickness of 50 μm or less;
mixing the scaly graphite particles with copper particles having a median diameter of 1.5 μm or less to obtain a molding raw material; and
sintering a molded body obtained by molding the molding raw material by a multiaxial electric current sintering method.

8. The method of claim 7, further comprising wet-mixing the mixture of the scaly graphite particles and the copper particles with an organic solvent to obtain the molding raw material.

* * * * *